United States Patent [19]
Hagen

[11] Patent Number: 5,790,395
[45] Date of Patent: Aug. 4, 1998

[54] LOW IN-RUSH CURRENT POWER FACTOR CONTROL CIRCUIT

[76] Inventor: Thomas E. Hagen, 9041 Cheshire La., Maple Grove, Minn. 55369

[21] Appl. No.: 807,662

[22] Filed: Feb. 27, 1997

[51] Int. Cl.[6] .................... H02M 3/335; H02M 5/42; G05F 1/10; G05F 1/70
[52] U.S. Cl. .................. 363/89; 363/16; 323/207; 323/222
[58] Field of Search .................. 363/16, 44, 80, 363/89, 124; 323/207, 222, 908

[56] References Cited

U.S. PATENT DOCUMENTS

| | | | |
|---|---|---|---|
| 4,384,321 | 5/1983 | Rippel | 363/124 |
| 4,683,529 | 7/1987 | Bucher, II | 363/44 |
| 4,885,675 | 12/1989 | Henze et al. | 363/26 |
| 5,045,991 | 9/1991 | Dhyanchand et al. | 363/89 |
| 5,146,396 | 9/1992 | Eng et al. | 363/16 |
| 5,224,025 | 6/1993 | Divan et al. | 363/16 |
| 5,291,119 | 3/1994 | Cowett, Jr. | 323/207 |
| 5,321,600 | 6/1994 | Fierheller | 363/65 |
| 5,349,284 | 9/1994 | Whittle | 323/207 |
| 5,359,277 | 10/1994 | Cowett, Jr. | 323/207 |
| 5,371,667 | 12/1994 | Nakao et al. | 363/124 |
| 5,404,093 | 4/1995 | Cowett, Jr. | 323/207 |
| 5,416,687 | 5/1995 | Beasley | 363/44 |
| 5,420,780 | 5/1995 | Bernstein et al. | 363/89 |
| 5,430,364 | 7/1995 | Gibson | 323/222 |
| 5,446,646 | 8/1995 | Miyazaki | 363/89 |
| 5,471,117 | 11/1995 | Ranganath et al. | 315/247 |
| 5,489,837 | 2/1996 | Arakawa | 323/207 |
| 5,519,306 | 5/1996 | Itoh et al. | 323/222 |

OTHER PUBLICATIONS

Motorola, Inc., *Motorola Semiconductor Technical Data*, 1993, Brochure.

Bob Christianson, *Basic Design Calculations for an Electronic Ballast PFC Circuit*, Aug. 1990, pp. 32–35.

*Primary Examiner*—Peter S. Wong
*Assistant Examiner*—Bao Q. Vu
*Attorney, Agent, or Firm*—Palmatier, Sjoquist, Voigt & Christensen, P.A.

[57] ABSTRACT

A low in-rush current power factor control circuit that provides near unity power factor, is capable of controlling and limiting the in-rush current that occurs when the circuit is initially supplied with an AC mains input voltage and is further capable of controlling the DC output voltage of the circuit from a level above to below the peak AC mains input voltage.

20 Claims, 5 Drawing Sheets

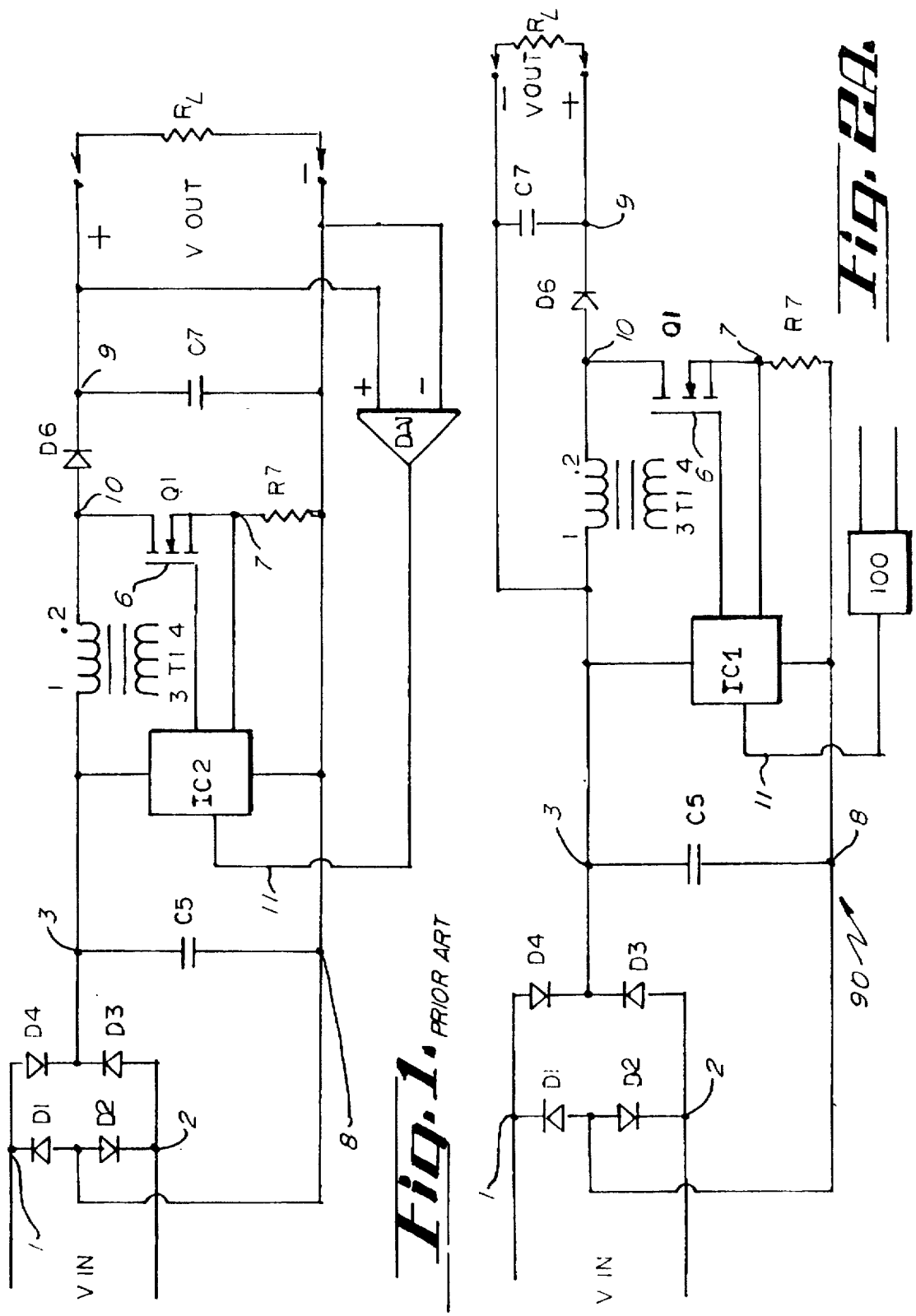

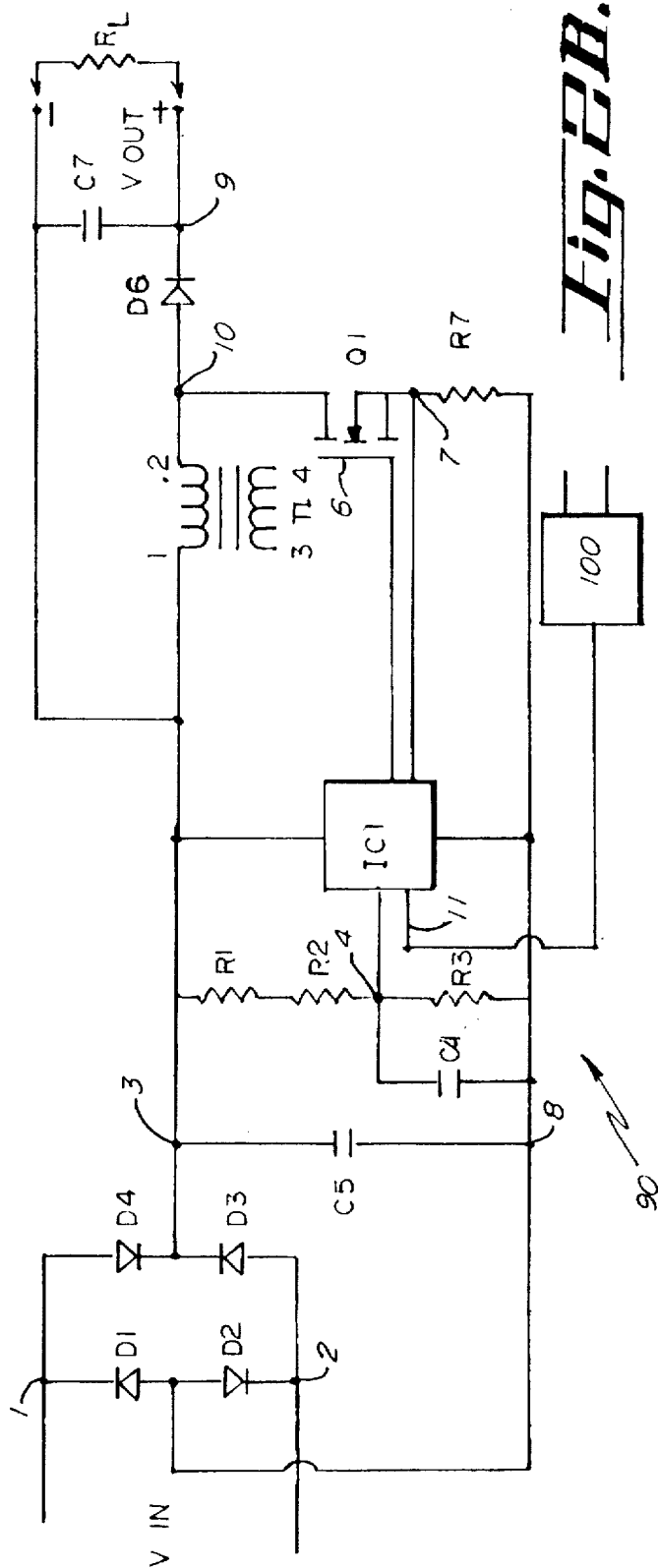
Fig. 2B.
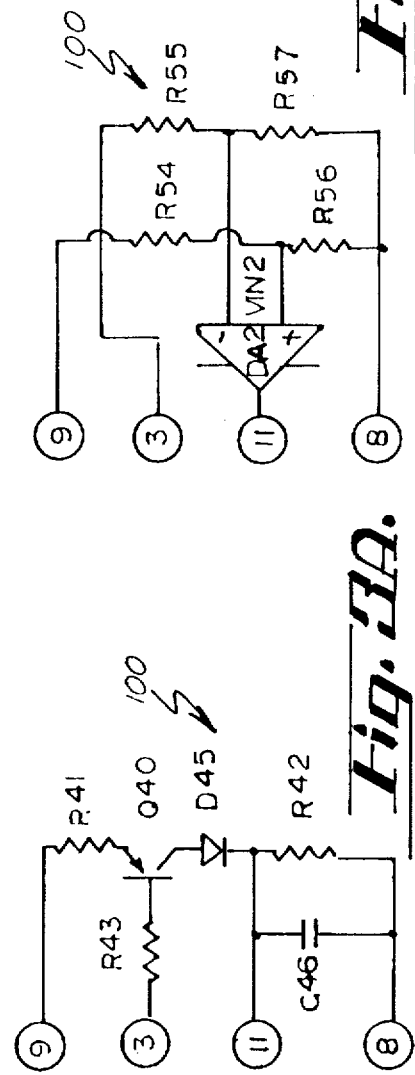
Fig. 3B.
Fig. 3A.

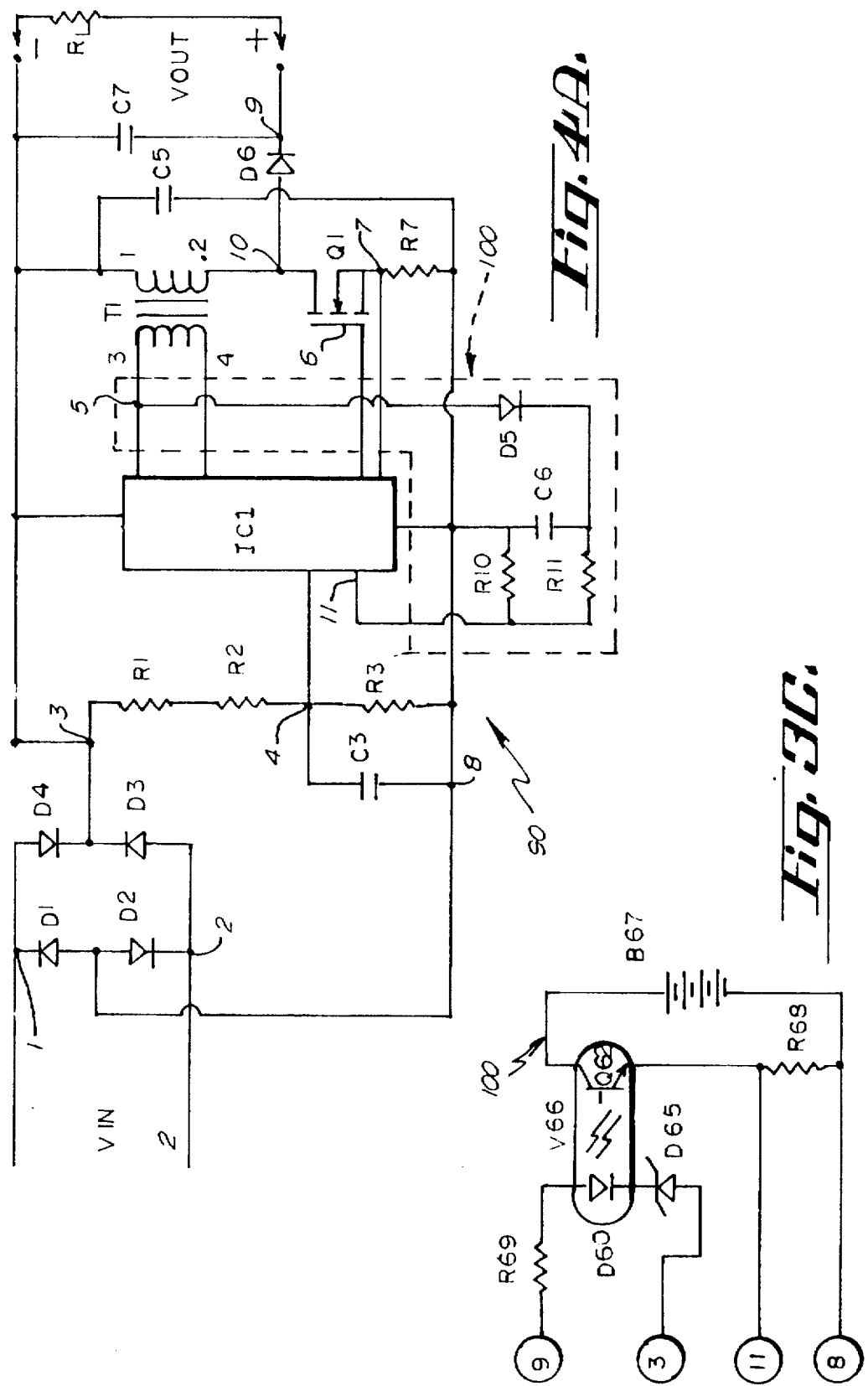

LOW IN-RUSH CURRENT POWER FACTOR CONTROL CIRCUIT

BACKGROUND

This invention relates to a power factor control circuit and more particularly to a power factor control circuit capable of limiting in-rush current and regulating DC output voltage from a level above to below an AC mains input peak voltage.

FIG. 1 depicts a common prior art "boost" style power factor correction circuit. The circuit configuration is as follows; the AC mains input, Vin, is referenced between nodes 1 and 2 of a bridge rectifier, comprised of D1, D2, D3 and D4, with the cathode and anode sides of the bridge rectifier referenced to nodes 3 and 8 respectively; a high frequency bypass capacitor, C5, is referenced between nodes 3 and 8; a non-saturating inductor, T1, is referenced between nodes 3 and 10; a power factor control integrated circuit, IC1, is referenced between nodes 3 and 8 and a has a feedback input at node 11; a power switch, Q1, is referenced between nodes 10 and 7 and has an enable/disable input from IC1 at node 6; a current sense resistor, R7, is referenced between nodes 7 and 8; a recovery diode, D6, is referenced between nodes 9 and 10; and an output filtering capacitor, C7, is referenced between nodes 9 and 8. A feedback device, in this case a differential amplifier, DA1, is referenced between nodes 9 and 8 with the feedback signal from the device returned to node 11 at IC1; the feedback is used by IC1 to manipulate the switching of Q1 and thereby regulate the DC output voltage, Vout. A load on the circuit is represented by $R_L$ across C7.

As described above and as is standard, the output filtering capacitor, C7, is referenced to the negative or anode side of the rectifying bridge. Thus, when the circuit is operating, current flows out of the cathode side of the bridge rectifier. The majority of this current then flows through the inductor T1 and through diode D6 to charge capacitor C7. The result of this circuit configuration is that upon initially applying the AC mains input voltage, Vin, to the circuit, the components experience a large in-rush current; the output filtering capacitor, C7, presents a very low impedance to the AC mains input and draws excessive current as it charges up. Notably, this current can be large enough to cause an AC mains switching mechanism to fail.

Another problem that necessarily results from the standard prior art circuit configuration is that the DC output voltage, Vout, must be higher than the peak AC input voltage for the circuit to work efficiently. In other words, C7 must be able to charge to a voltage above the peak AC input voltage in order for the inductor T1 to discharge in a timely manner to insure efficient and proper operation of the circuit. The standard prior art circuit is thus limited as to low voltage regulation. For example, with a typical 120 volt AC mains input the minimum circuit output voltage is approximately 230 DC volts and with a 277 volt AC mains input the minimum circuit output voltage is approximately 440 DC volts. These high output voltages require that expensive high voltage components be used in the circuits that follow thereby increasing the overall cost of the circuit.

Based on the foregoing, there is a need for a power factor control circuit that provides a near unity power factor and is capable of controlling and limiting the in-rush current as well as capable of controlling the DC output voltage from a level above to below the peak AC input voltage.

SUMMARY

A power factor control circuit to provide near unity power factor, control in-rush current and control the DC output voltage from a level above to below the peak AC mains input voltage. The circuit comprises a first rectifier portion for rectifying the AC mains input to a full wave rectified output; a first energy storage device for storing energy that is drawn from the AC mains input; a switch for drawing energy through and storing energy within the first energy storage device when the switch is enabled and for releasing the energy stored within the first energy storage device when the switch is disabled; a filter for filtering switching transients resulting from the switching of the switch; a power factor control circuit that manipulates an enable/disable input of the switch to facilitate power factor regulation and DC output voltage regulation; a second rectifier portion for half-wave rectifying the released energy from the first energy storage device; a second energy storage device for storing the half-wave rectified released energy from the second rectifier portion; a current limiter for limiting in-rush current; and feedback portion for determining the level of the DC output voltage and for sending this level back to the power factor control circuit's feedback input.

An object and advantage of the present invention is that the power factor control circuit is able to limit in-rush current thereby protecting circuits being supplied by the power factor control circuit from arcing and welding of contacts.

A further object and advantage of the present invention is that the power factor control circuit is capable of regulating the DC output voltage from a level above to below the peak AC input voltage.

Another advantage of the present invention is that the power factor control circuit's ability to regulate the DC output voltage from a level above to below the peak AC input voltage eliminates the need for expensive, high voltage rated components, rather lower rated and less expensive components may be used reducing the overall cost of the circuit.

Yet another object and advantage of the present invention is that the power factor control circuit is of a relatively simple design that is easy to understand and build with standard components.

Yet another object and advantage of the present invention is that the power factor control circuit can employ a number of feedback methods to achieve DC output voltage regulation. This allows the user to select which feedback method is appropriate with regard to cost and other circumstantial considerations.

DRAWINGS

These and other features, aspects, and advantages of the present invention will become better understood with regard to the following description, appended claims, and accompanying drawings where:

FIG. 1 is a common prior art "boost" style power factor control circuit;

FIG. 2A is the low in-rush current power factor control circuit of the present invention;

FIG. 2B is the low in-rush current power factor control circuit of the present invention incorporating an AC phase timing network;

FIG. 3A is the pnp method of direct feedback control for use with the circuits of FIGS. 2A and 2B;

FIG. 3B is the differential amplifier method of direct feedback control for use with the circuits of FIGS. 2A and 2B;

FIG. 3C is the opto-isolated method of direct feedback control for use with the circuits of FIGS. 2A and 2B;

FIG. 4A shows the circuit of FIG. 2B incorporating a self-contained indirect feedback method;

DETAILED DESCRIPTION

Figure 4B:
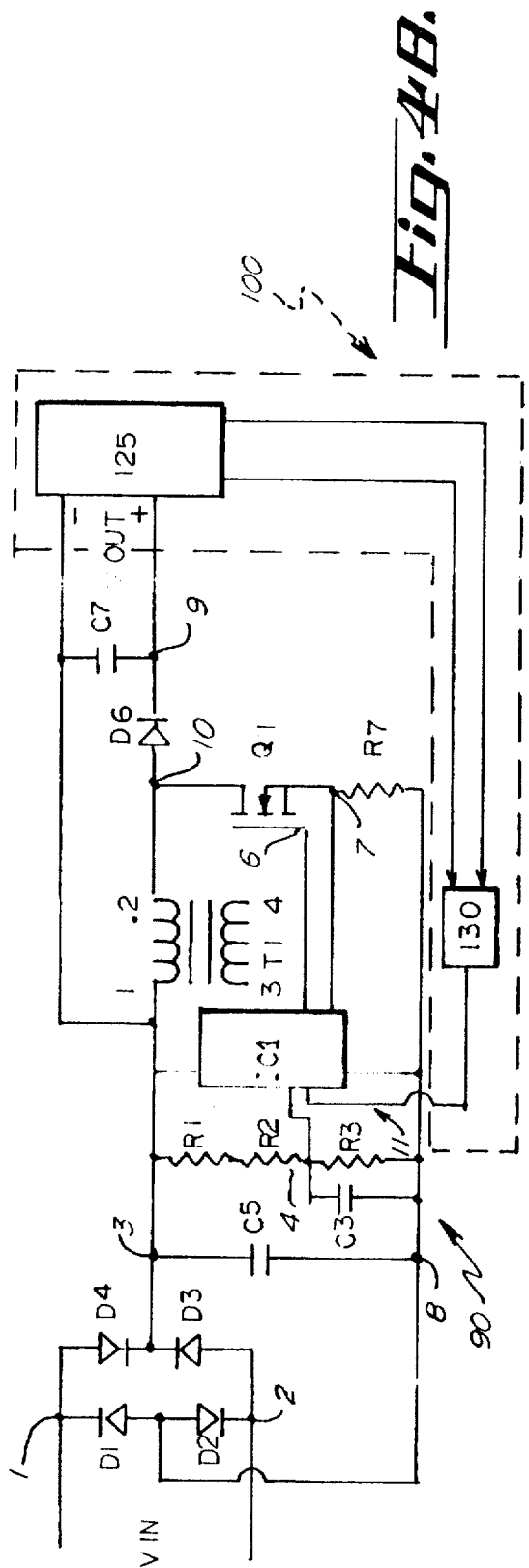
FIG. 4B shows the circuit of FIG. 2B utilizing an indirect method of feedback, the feedback signal determined from a following, supplied circuit.

FIG. 2A depicts the low in-rush current power factor control circuit 90. In general, the circuit 90 incorporates a first rectifier portion comprised of D1, D2, D3, and D4, a filter C5, a first energy storage device T1, a switch Q1, a current limiter R7, a second rectifier portion D6, a second energy storage device C7, a power factor control circuit, IC1, and a feedback portion, 100.

Note that like elements and like nodes are numbered consistently throughout each of the representative circuits.

The layout of the circuit of FIG. 2A can be described as follows: an AC mains input voltage, Vin, is referenced between nodes 1 and 2 of a bridge rectifier comprising D1, D2, D3 and D4. The bridge rectifier acts as a first rectifier portion or first rectifying means, with the cathode and anode sides of the bridge rectifier referenced to nodes 3 and 8 (ground) respectively; a high frequency bypass capacitor, C5, is referenced between nodes 3 and 8 and performs the function of a filter or filtering means; a non-saturating inductor, T1, having winding 1-2 and winding 3-4, performing as the first energy storage device or first energy storage means, is referenced between nodes 3 and 10; a power factor control circuit or means, IC1, comprising a power factor control IC (integrated circuit), is referenced between nodes 3 and 8; a switch or switching means, Q1, is referenced between nodes 10 and 7 has an enable/disable input from IC1 at node 6; a current limiter or current limiting means, R7, is referenced between nodes 7 and 8; a recovery diode, D6, performing the function of a second rectifier portion or second rectifying means, is referenced between nodes 9 and 10; an output filtering capacitor, C7, which is a second energy storage device or means, is referenced between nodes 9 and 3; and a feedback portion, feedback means, or circuit portion, 100, is input to IC1 at node 11. Together, C5, T1, IC1, Q1, R7, D6 and C7 form a current and voltage regulator. A DC output voltage across nodes 9 and 3 is represented by Vout. A load circuit is represented by $R_L$ across C7.

With respect to the appended claims, a first common point is consistent with node 10, a second common point is consistent with node 7 and a third common point is consistent with node 9.

Note that the components are identical to that of the common prior art "boost" style power factor correction circuit of FIG. 1. However, the output filter capacitor, C7, functioning as the second energy storage device is now referenced between node 9 and node 3, node 3 being the cathode side of the rectifying bridge. Positioning C7 with reference to node 3 eliminates the current path that once existed from node 3 through C7 to node 8 which resulted in the allowance of an in-rush current and a rapid charging of C7. The low in-rush current power factor control circuit 90 can now use the inductance of the first energy storage device, T1, to limit the amount of charging current going to the second energy storage device, C7.

Figure 5:
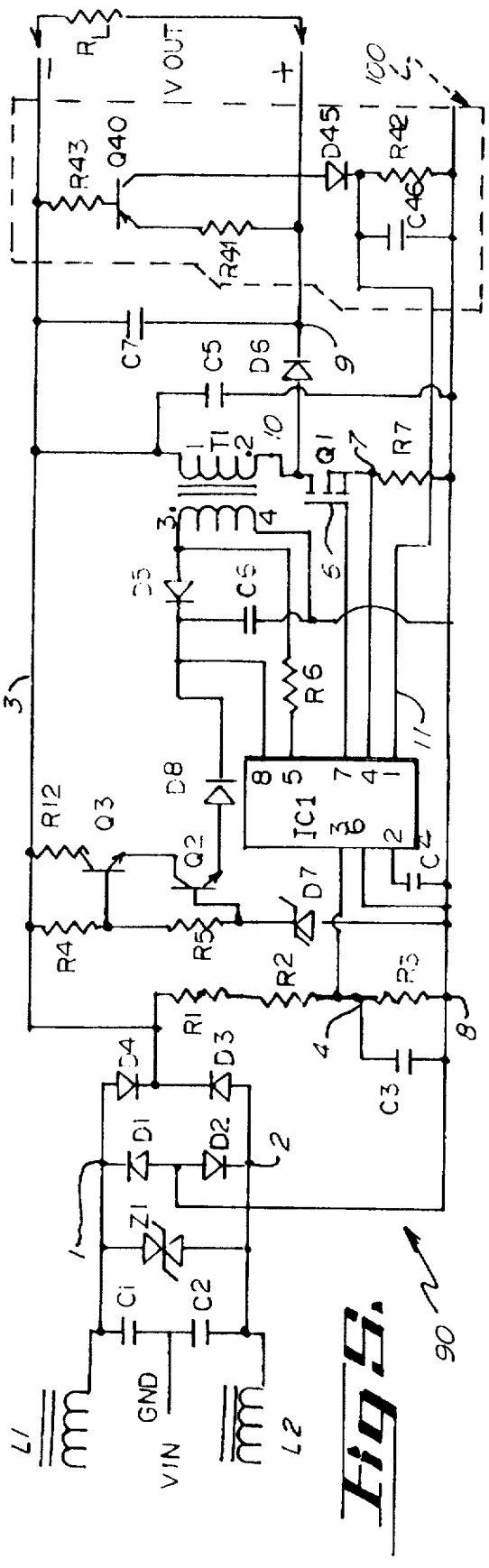
FIG. 5 depicts an industrial application-type low in-rush current power factor control circuit using the pnp method of direct feedback.
Figure 6:
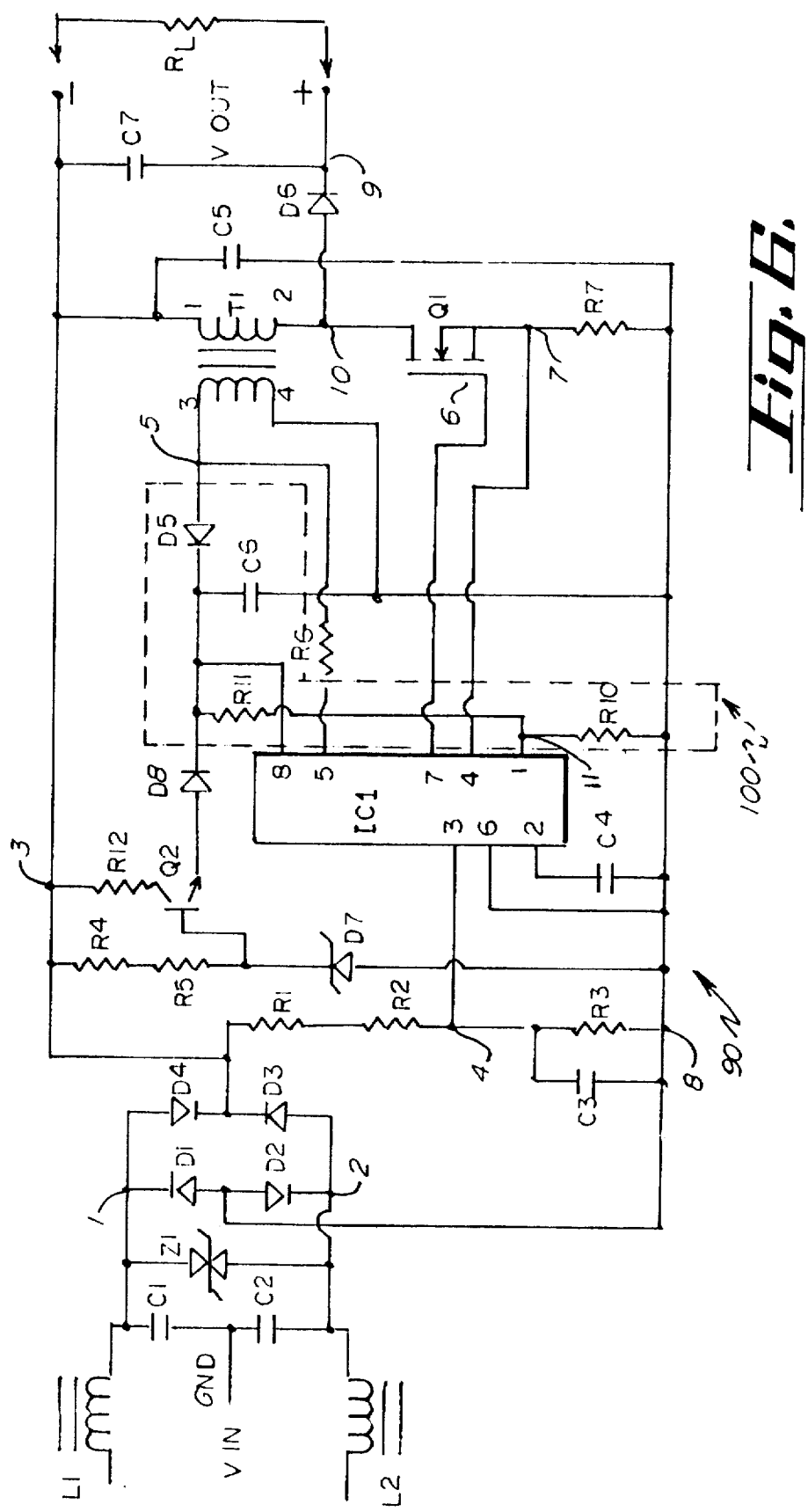
FIG. 6 depicts an industrial application-type low in-rush current power factor control circuit using the self-contained indirect feedback method.

FIG. 2B depicts the low in-rush power factor control circuit 90 with an additional AC phase timing network. The network comprises two resistors, R1 and R2, which lie in series between nodes 3 and 4 and a resistor, R3, and a capacitor, C3, which lie in parallel between nodes 4 and 8. R1, R2, and R3 form a voltage divider network that takes the full wave rectified AC voltage from the first rectifier portion and makes the amplitude acceptable to the power factor control circuit, IC1. R1 and R2 could be replaced with one resistor of sufficient voltage rating. C3 is used as a noise filtering capacitor. A resulting AC phase signal at node 4 is input to the power factor control circuit, IC1, and is used to assist in modulating the frequency of the switch Q1 (discussed further below). The AC phase timing network may or may not be necessary to the circuit depending on the IC used for the power factor control, if it is necessary the AC phase timing network may also be considered part of the current and voltage regulator. The MC34262 is a suitable IC and does require the AC phase timing network. The MC34262 is available from MOTOROLA®; the publication entitled *Motorola Semiconductor Technical Data, Advance Information, Power Factor Controllers* (© Motorola 1993) describing operation of the MC34262 is hereby incorporated by reference. The MC34262 is depicted in the circuits of FIGS. 5 and 6 along with the AC phase timing network. Note, that an IC that is able to accept the AC signal without amplitude modification will work similarly to an IC that requires and has an AC phase timing network.

Operation of the low in-rush current power factor control circuit 90 of FIG. 2B may now be appreciated. The AC input voltage, Vin, at nodes 1 and 2 are full wave rectified by the first rectifier portion. The positive output of the first rectifier portion at node 3 is then fed to the following: (1) the AC phase timing network to adapt the AC signal for the power factor control circuit, IC1; (2) the filter, C5, for filtering switching transients; (3) the first energy storage device, T1; (4) the negative voltage potential of the DC output voltage, Vout; and (5) the bottom end of the second energy storage device, C7. The voltage potential at node 3, with respect to node 8, rises and falls as determined by the full wave rectified voltage of the first rectifier portion. The voltage at node 9 is determined by the amount of energy transferred from winding 1-2 of the first energy storage device, T1, to the second energy storage device, C7.

Note that when the switch, Q1, is initially enabled current is drawn through winding 1-2 of the first energy storage device, T1. Winding 1-2 of T1 will continue to draw current until the power factor control circuit, IC1, senses from the current limiter, R7, that R7 has reached a maximum predetermined voltage. Once that predetermined voltage is reached, the power factor control circuit, IC1, disables Q1 through Q1's enable/disable input. With Q1 disabled, the energy contained in winding 1-2 of T1 flies back and charges the second energy storage device, C7, thereby producing the DC output voltage, Vout, between nodes 3 and 9. Thus, the continuing regulation of voltage across C7 is performed strictly by controlling the frequency of the enable/disable cycle of switch Q1 by IC1. This enable/disable cycle is determined by two factors: (1) the AC phase signal entering the power factor control circuit, IC1, at node 4; and (2) the amount of energy required by the load across nodes 3 and 9. The power factor control circuit, IC1, may determine this amount of load energy as a feedback voltage by either direct or indirect feedback portion 100.

When using a direct feedback portion 100, which is a feedback portion that measures voltage across nodes 3 and 9, it is essential to keep in mind that to get a useful feedback voltage one must take into account that node 3's voltage is a full wave rectified AC signal and node 9's voltage is also a full wave rectified AC signal riding on top of a DC level. One of the direct feedback portions 100 that accounts for these factors and is thereby able to separate and determine the DC voltage level apart from the AC voltage is shown in FIG. 3A; a PNP method of direct feedback. A PNP transistor, Q40, is connected in common base configuration; the base is tied to node 3 through a resistor, R43, and the emitter is tied to node 9 through a resistor, R41. The collector is connected to the anode side of a diode, D45 while the cathode side of the diode, D45, is tied directly to node 11 to provide the feedback voltage. The cathode side of the diode, D45, is also tied to node 8 (ground) through a resistor, R42. Across the resistor, R42, is a capacitor, C40, referenced between nodes 11 and 8. In the above described feedback configuration, the collector current is proportional to the DC voltage across nodes 3 and 9.

An example of how to select component values of the PNP method of direct feedback follows: the resistor, R41, is selected to give 0.5 milliampere of emitter current when connected to node 9. For 100 volts of DC output, R41 would equal approximately 198,000 ohms (R41=(100-Vbe)/0.0005, where Vbe is the base-emitter voltage). Note that with the collector of the PNP transistor, Q40, connected to the anode of the diode D45, D45 functions to disconnect the collector when the voltage at node 3 drops below the reference voltage (the reference voltage, Vref, is an internal voltage that is provided by IC1. Vref is the voltage that the feedback voltage is compared to within IC1). The cathode side of D45 is connected to a resistor R42 whose value should be chosen to equal the reference voltage when the 0.5 milliampere collector current passes through it (R42=Vref/0.0005). C46 is used for filtering out noise spikes and also to hold up the feedback voltage when node 3's voltage briefly approaches ground and drops below the reference voltage and its value should be chosen appropriately.

A second direct feedback portion 100 is shown in FIG. 3B; a differential amplifier method of feedback. The positive input terminal of the differential amplifier, DA2, is tied to node 9 through resistor, R54, and to node 8, through resistor R56. The negative input terminal of the differential amplifier, DA2, is tied to node 3 through resistor R55 and to node 8, through resistor R57. The differential amplifier works to subtract the AC voltage at node 3 from the AC voltage riding atop a DC voltage level at node 9. The subtraction yields a feedback voltage that is correlative to the DC output voltage, Vout. The feedback voltage is fed back to the power factor control circuit, IC1, at node 11. In determining component values consideration should be given to the following: (1) R54 and R57 should be equal in value as should R56 and R55; (2) the voltage into the differential amplifier, Vin2, is equivalent to Vout(R54)/(R54+R56); and (3) the gain of the differential amplifier should be set to produce a voltage out of the differential amplifier (the feedback voltage) equivalent to Vref with a value of Vin2 described above.

A third direct feedback portion 100 is shown in FIG. 3C; an opto-isolated method of direct feedback. A photo sensitive semi-conductor, U66, incorporates a light emitting diode (LED), D60, and an NPN transistor, Q61, in the common emitter configuration. The LED, has its cathode tied to node 9 through a resistor, R69, while the anode of the same LED is tied to node 3 through a zener diode, D65. A voltage source, B67, is tied between node 8 and the collector of the transistor, Q61. The emitter of the transistor, Q61, is tied to node 11 (feedback node) and to node 8 through a resistor R68. Since the LED is connected across nodes 9 and 3, its light intensity is proportional to the DC output voltage Vout. The light intensity will cause the semiconductor device, U66, to vary its conductivity (or current generation) according to the intensity of the light. This conductivity when combined with a suitable value of R69 will cause the output voltage, Vout, to be held at such an amplitude as to force node 11 to be held at the reference voltage, Vref.

In selecting component values for the opto-isolated method of feedback consideration should be given to the following: (1) the zener diode voltage of D65 should be selected to be slightly under the desired DC output voltage, Vout; (2) R69 should be selected to be only a few volts with nominal light emitting diode current; (3) the photo sensitive semi-conductor's transistor, Q61, acts as a current source for R68; (4) the current out of the transistor, Q61, is proportional to the LED light which is proportional to the LED current; (5) the value of voltage B67 has to be large enough to be greater than the voltage drop across R68 and greater than the saturation voltage of the photo sensitive semi-conductor's transistor, Q61; (6) R68 should be selected to give a voltage across it that is equal to Vref.

A first indirect feedback portion 100, which is a feedback method other than measuring voltage across nodes 3 and 9, of voltage regulation is shown in FIG. 4A which incorporates the circuit of FIG. 2B. The first indirect feedback portion 100 uses the secondary voltage across winding 3-4 of the first energy storage device, T1, which is measured at node 5, to feed to the feedback input, node 11, of the power factor control circuit, IC1. As long as the polarity of winding 3-4 is correctly observed, the peak voltage across winding 3-4 will be proportional to the DC voltage output, Vout, of the circuit and will also be proportional to the turns ratio of T1. Note that before the voltage as measured at node 5 is fed into the power factor control circuit, IC1, the voltage is rectified. The rectifier is composed of diode, D5, capacitor, C6 and resistors, R10 and R11; the capacitor, C6, stores the voltage then, R10 and R11 work as voltage dividers to provide the feedback voltage at node 11 for the power factor control circuit, IC1. Using node 5 as a feedback point has the advantage that the feedback voltage is free of the AC voltage full wave rectified pedestal that was a concern in the direct feedback methods.

A second indirect feedback portion 100 for DC output voltage regulation is depicted in FIG. 4B and involves: (1) sampling the voltage from the circuit being supplied, which is designated circuit 125; (2) rectifying the voltage with rectifying means 130 to a level acceptable to IC1; and (3) inputting the rectified feedback voltage to the power factor control circuit, IC1, at node 11 by preferably using a rectifier circuit incorporating a diode, capacitor and dual resistor combination as described in the paragraph above.

Note that all of the above described feedback portion 100 will work with either the circuit of FIG. 2A or the circuit of FIG. 2B, actual configuration is based on selection of the power factor control circuit, IC1 and whether or not the integrated circuit requires the AC phase timing network.

Further note that all feedback methods will provide a feedback voltage to IC1. IC1 will use this feedback and the AC phase input to manipulate the switching of Q1 and thereby maintain a desired DC output voltage from anywhere above to below the AC mains peak input voltage.

The power factor control circuit, IC1, may or may not require an inductor flux signal feedback from the first energy storage device T1. Such an inductor flux signal is depicted in FIG. 4A where winding 3-4 is directly tied to IC1.

Winding 3-4 can be used to sense when the energy stored in T1 is zero and thus is ready to be charged again by enabling switch Q1. Once again, actual configuration is based on selection of the power factor control circuit, IC1.

Additionally, the power factor control circuit, IC1, may or may not require a resistor, such as R7, to serve as a current limiter. In the case where IC1 is an MC34262 a resistor like R7 is necessary. The MC34262 requires sampling of the current through the switch, Q1; the voltage across R7 is used for this sampling. This sampling feature of the MC34262 has been taken advantage of to limit the in-rush current by setting the maximum current through Q1 by choosing a certain value of R7. In the instance where R7 is chosen to be 0.1 ohms, the circuit will disable the switch, Q1, when the voltage across R7 exceeds 1.5 volts. Essentially, this is a safety feature that is also used to limit the in-rush current. However, there are other power factor control circuits (different ICs) that do not require current sampling to limit current but rather employ an increased switching frequency. Whether current sampling or increased switching frequency is used, the low in-rush current power factor control circuit 90 will operate in a similar manner.

An industrial application-type circuit depicting the low in-rush current power factor control circuit 90 using the pnp method of direct feedback is shown in FIG. 5. The functions of the components are described below:

(1) L1, L2, C1 and C2 form a basic electromagnetic interference filter. Z1 is a high voltage transient suppressor that provides protection for the load circuits;

(2) D1, D2, D3 and D4 form a diode bridge rectifier, the first rectifier portion, for full wave rectifying the AC mains input voltage, Vin;

(3) R1, R2 and R3 divide the full wave rectified voltage at node 3, as referenced to node 8, to a suitable level for the power factor control IC, IC1;

(4) C3 filters any noise spikes from entering IC1 at its AC phase signal input;

(5) C4 is used by the power factor control circuit, IC1, to stabilize its error amplifier;

(6) IC1 is an MC34262 and is the power factor control circuit that manipulates the enable/disable cycle of switch Q1 to facilitate good power factor regulation and DC output regulation (pin designations of the MC34262: pin 1—voltage feedback input from node 11; pin 2—error amplifier compensation; pin 3—AC phase signal input; pin 4—current sensing/limiting input; pin 5—ZID, zero current detect input; pin 6—ground; pin 7—switch enable/disable output; pin 8—Vcc);

(7) R4 and R5 provide the biasing current for the zener diode D7 and the base current for Q2, which together form a quick start up circuit;

(8) D7 is selected for sufficient voltage such that with the Vbe (base-emitter voltage) loss of Q2 and the forward voltage drop of D8 there is still enough voltage to start IC1 into operation;

(9) Q2 is an emitter follower circuit that provides rapid charging current for C6, this allows the power factor control circuit, IC1, to turn on within one half cycle of power being applied to the AC mains input, Vin;

(10) R12 provides current limiting for Q2 and also protects Q2 from transients that might cause failures;

(11) Q3 is optional and may be used to extend the input voltage range by dividing the input voltage in half across Q2 and Q3, the voltage division is performed by R4 and R5;

(12) D8 prevents Q2's Vbe junction from being reversed voltage stressed if the voltage across C6 rises more than a few volts;

(13) Q40, R43, R41, D45, R42 and C46 form the feedback portion 100, this is the pnp method of direct feedback described earlier;

(14) C6 is the filter capacitor for the power factor control circuit, IC1;

(15) D5 is used to rectify the voltage from windings 3-4 of T1. C6 stores the charge that D5 delivers;

(16) R6 limits the current going into the ZID input of the power factor control circuit, IC1;

(17) T1 is the first energy storage device. It functions to store the energy being taken from the AC mains input, Vin, and then transfers that energy to C7 to maintain the DC voltage output, Vout. Windings 1-2 are used for the energy transfer function. Windings 3-4 have a multipurpose function. One purpose is to indicate to the power factor control circuit, IC1, that the energy in T1 has dropped to zero. This is indicated when the voltage on winding 3-4 goes to zero from a positive level. Another purpose of winding 3-4 is to provide efficient power to IC1;

(18) Q1 is the switch. It is the transistor switch that charges up T1's windings with stored energy and then releases the stored energy to be transferred to C7. Q1 is depicted as a MOSFET, however, other semiconductor switches can be used here in place of the MOSFET;

(19) R7 is the current limiter and is used for sensing the current in Q1 and T1. This current sensing prevents the over stressing of Q1. In addition, it also limits the maximum in-rush current under normal operations. By selecting this value properly along with selecting the inductance in T1, the in-rush current can be set so that it does not exceed the maximum limits under normal conditions;

(20) C5 is the filter and is used as a low impedance path to reduce the switching transients when Q1 switches from enabled to disabled and vice-versa;

(21) D6 is the second rectifier portion and provides half wave rectification for charging C7 to its proper level;

(22) C7 is the second energy storage device and also serves as the DC output filter. In the above configuration, all elements except those designated in items 1, 2 and 13, may be consider the essential components of the current and voltage regulator.

An industrial application-type circuit depicting the low in-rush current power factor control circuit 90 using the first described method of indirect feedback is shown in FIG. 6. The functions of the components are described below:

(1) L1, L2, C1 and C2 form a basic electromagnetic interference filter. Z1 is a high voltage transient suppressor that provides protection for the load circuits;

(2) D1, D2, D3 and D4 form a diode bridge, the first rectifier portion, for full wave rectifying the AC mains input voltage, Vin;

(3) R1, R2 and R3 divide the full wave rectified voltage at node 3, as referenced to node 8, to a suitable level for the power factor control IC, IC1;

(4) C3 filters any noise spikes from entering IC1 at its AC phase signal input;

(5) C4 is used by the power factor control circuit, IC1, to stabilize its error amplifier;

(6) IC1 is an MC34262 and is the power factor control circuit that manipulates the enable/disable cycle of switch Q1 to facilitate power factor regulation and DC output regulation (pin designations of the MC34262: pin 1—voltage feedback input from node 11; pin 2—error amplifier compensation; pin 3—AC phase signal input; pin 4—current sensing/limiting input; pin 5—ZID, zero current detect input; pin 6—ground; pin 7—switch enable/disable output; pin 8—Vcc);

(7) R4 and R5 provide the biasing current for the zener diode D7 and the base current for Q2, which together form a quick start up circuit;

(8) D7 is selected for sufficient voltage such that with the Vbe (base-emitter voltage) loss of Q2 and the forward voltage drop of D8 there is still enough voltage to start IC1 into operation;

(9) Q2 is an emitter follower circuit that provides rapid charging current for C6, this allows the power factor control circuit, IC1, to turn on within one half cycle of power being applied to the AC mains input;

(10) R12 provides current limiting for Q2 and also protects Q2 from transients that might cause failures;

(11) D8 prevents Q2's Vbe junction from being reversed voltage stressed if the voltage across C6 rises more than a few volts;

(12) R11 and R10 are used in the indirect method of voltage regulation, they form voltage dividers that divide the DC voltage at pin 8 (Vcc) down to the reference voltage (Vref is ~2.5 volts). In the indirect regulation method Vcc is one of the voltages that can be regulated to reflect the voltage variations in the DC voltage output of the circuit;

(13) C6 is the filter capacitor for the power factor control circuit, IC1;

(14) D5 is used to rectify the voltage from windings 3-4 of T1. C6 stores the charge that D5 delivers;

(15) R6 limits the current going into the ZID input of the power factor control circuit, IC1;

(16) T1 is the first energy storage device. It functions to store the energy being taken from the AC mains input, Vin, and then transfers that energy to C7 to maintain the DC output voltage, Vout. Windings 1-2 are used for the energy transfer function. Windings 3-4 have a multi-purpose function. One purpose is to indicate to the power factor control circuit, IC1, that the energy in T1 has dropped to zero. This is indicated when the voltage on winding 3-4 goes to zero from a positive level. Another purpose of winding 3-4 is to provide efficient power to IC1. Yet another purpose of winding 3-4 is to regulate the DC output by inferring the voltage out from the turns ratio of T1 and then using resistors R11 and R10 for regulating the feedback (see the first indirect feedback portion 100 described earlier);

(17) Q1 is the switch. It is the transistor switch that charges up T1's windings with stored energy and then releases the stored energy to be transferred to C7. Q1 is depicted as a MOSFET, however, other semiconductor switches can be used here in place of the MOSFET;

(18) R7 is the current limiter and is used for sensing the current in Q1 and T1. This current sensing prevents the over stressing of Q1. In addition, it also limits the maximum inrush current under normal operations. By selecting this value properly along with selecting the inductance in T1, the in-rush current can be set so that it does not exceed the maximum limits under normal conditions;

(19) C5 is the filter and is used as a low impedance path to reduce the switching transients when Q1 switches from enabled to disabled and vice-versa;

(20) D6 is the second rectifier portion and provides half wave rectification for charging C7 to its proper level;

(21) C7 is the second energy storage device and also serves as the DC output filter. In the above configuration, all elements except those designated in items 1, 2 and those items in the feedback portion 100, may be consider the essential components of the current and voltage regulator.

The present invention may be embodied in other specific forms without departing from the spirit of the essential attributes thereof; therefor, the illustrated embodiment should be considered in all respects as illustrative and not restrictive, reference being made to the appended claims rather than to the foregoing description to indicate the scope of the invention.

What is claimed:

1. A low in-rush current power factor control circuit, the circuit having a ground, an AC mains input voltage with a peak voltage and a DC output voltage, the circuit for regulating power factor, for limiting in-rush current that occurs upon initially applying the AC mains input voltage to the circuit and for regulating DC output voltage from a level above to below the peak voltage of the AC mains input voltage, comprising:

(a) a first rectifier portion for rectifying the AC mains input to a full wave rectified output;

(b) a first energy storage device for storing energy drawn from the AC mains input, said first energy storage device disposed between said full wave rectified output and a first common point;

(c) a switch configured to be enabled and disabled by an enable/disable input, said switch when enabled adapted to draw energy through said first energy storage device whereby energy is stored within said first energy storage device, said switch when disabled adapted to release the energy stored in said first energy storage device, said switch disposed between said first common point and a second common point;

(d) a filter for filtering switching transients resulting from said switch switching from enabled to disabled and disabled to enabled, said filter disposed between said full wave rectified output and ground;

(e) a power factor control circuit configured for manipulating the enable/disable input of said switch to facilitate power factor regulation and DC output voltage regulation, said power factor control circuit having a current limiting input, a feedback input and an AC input tied to said full wave rectified output, said power factor control circuit tied to ground;

(f) a second rectifier portion for half-wave rectifying the released energy from said first energy storage device, said second rectifier portion disposed between said first common point and a third common point;

(g) a second energy storage device for storing the half-wave rectified released energy from said second rectifier portion, a DC output voltage maintained across said second energy storage device, said second energy storage device disposed between said third common point and said full wave rectified output;

(h) a current limiter tied to said power factor control circuits' current limiting input the current limiter configured for limiting in-rush current, said current limiter disposed between said second common point and ground; and (i) a feedback portion for determining the level of said DC output voltage and sending said level to said power factor control circuits' feedback input.

2. The low in-rush current power factor control circuit of claim 1, wherein said feedback portion comprises a transistor.

3. The low in-rush current power factor control circuit of claim 1, wherein said feedback portion comprises a differential amplifier.

4. The low in-rush current power factor control circuit of claim 1, wherein said feedback portion comprises an opto-isolator.

5. The low in-rush current power factor control circuit of claim 1, wherein said first energy storage device is an inductor having a secondary winding with a voltage across said secondary winding and wherein said feedback portion utilizes said voltage across said secondary winding to determine the level of said DC output voltage.

6. The low in-rush current power factor control circuit of claim 1, wherein said power factor control circuits' AC input is a low level AC phase signal input, and wherein said low in-rush current power factor control circuit further comprises an AC phase timing network disposed between said full wave rectified output and ground, said AC phase timing network adapted to reduce said full wave rectified output to an acceptable low level for said power factor control circuits' low level AC phase signal input.

7. The low in-rush current power factor control circuit of claim 1, wherein said power factor control circuit has an inductor flux signal input and wherein said first energy storage device is an inductor having a secondary winding tied to said inductor flux signal input.

8. A low in-rush current power factor control circuit, the circuit having a ground, an AC mains input voltage with a peak voltage and a DC output voltage, the circuit for regulating power factor, for limiting in-rush current that occurs upon initially applying the AC mains input voltage to the circuit and for regulating DC output voltage from a level above to below the peak voltage of the AC mains input voltage, comprising:

(a) a first rectifier portion for rectifying the AC mains input to a full wave rectified output;

(b) a first energy storage device for storing energy drawn from the AC mains input, said first energy storage device disposed between said full wave rectified output and a first common point;

(c) a switch adapted to be enabled and disabled by an enable/disable input, said switch when enabled adapted to draw energy through said first energy storage device whereby energy is stored within said first energy storage device, said switch when disabled adapted to release the energy stored in said first energy storage device, said switch disposed between said first common point and a second common point;

(d) a filter for filtering switching transients resulting from said switch switching from enabled to disabled and disabled to enabled, said filter disposed between said full wave rectified output and ground;

(e) a power factor control circuit for manipulating the enable/disable input of said switch to facilitate power factor regulation and DC output voltage regulation, said power factor control circuit having a current limiting input, a feedback input and a low level AC phase signal input, said power factor control circuit tied to ground;

(f) an AC phase timing network disposed between said full wave rectified output and ground, said AC phase timing network adapted to reduce said full wave rectified output to an acceptable low level for said power factor control circuit' low level AC phase signal input;

(g) a second rectifier portion for half-wave rectifying the released energy from said first energy storage device, said second rectifier portion disposed between said first common point and a third common point;

(h) a second energy storage device for storing the half-wave rectified released energy from said second rectifier portion, a DC output voltage maintained across said second energy storage device, said second energy storage device disposed between said third common point and said full wave rectified output;

(i) a current limiter tied to said power factor control circuit' current limiting input for limiting in-rush current, said current limiter disposed between said second common point and ground; and (j) a feedback portion for determining the level of said DC output voltage and sending said level to said power factor control circuit' feedback input.

9. The low in-rush current power factor control circuit of claim 8, wherein said feedback portion comprises a transistor.

10. The low in-rush current power factor control circuit of claim 8, wherein said feedback portion comprises a differential amplifier.

11. The low in-rush current power factor control circuit of claim 8, wherein said feedback portion comprises an opto-isolator.

12. The low in-rush current power factor control circuit of claim 8, wherein said first energy storage is means is an inductor having a secondary winding with a voltage across said secondary winding and wherein said feedback portion utilizes said voltage across said secondary winding to determine the level of said DC output voltage.

13. The low in-rush current power factor control circuit of claim 8, wherein said power factor control circuit has an inductor flux signal input and wherein said first energy storage device is an inductor having a secondary winding tied to said inductor flux signal input.

14. A low in-rush current power factor control circuit, the circuit having a ground, an AC mains input voltage with a peak voltage and a DC output voltage, the circuit for regulating power factor, for limiting in-rush current that occurs upon initially applying the AC mains input voltage to the circuit and for regulating DC output voltage from a level above to below the peak voltage of the AC mains input voltage, comprising:

(a) first rectifying means for rectifying the AC mains input to a full wave rectified output;

(b) an inductor for storing energy drawn from the AC mains input, said inductor having a secondary winding, said inductor disposed between said full wave rectified output and a first common point;

(c) switching means adapted to be enabled and disabled by an enable/disable input, said switching means when enabled adapted to draw energy through said inductor whereby energy is stored within said inductor, said switching means when disabled adapted to release the energy stored in said inductor, said switching means disposed between said first common point and a second common point;

(d) filtering means for filtering switching transients resulting from said switching means switching from enabled to disabled and disabled to enabled, said filtering means disposed between said full wave rectified output and ground;

(e) power factor control means for manipulating the enable/disable input of said switching means to facilitate power factor regulation and DC output voltage regulation, said power factor control means having a current limiting input, a feedback input, an AC input tied to said full wave rectified output and an inductor flux signal input tied to said secondary winding, said power factor control means tied to ground;

(f) second rectifying means for half-wave rectifying the released energy from said inductor, said second rectifying means disposed between said first common point and a third common point;

(g) energy storage means for storing the half-wave rectified released energy from said second rectifying means, a DC output voltage maintained across said energy storage means, said energy storage means disposed between said third common point and said full wave rectified output;

(h) current limiting means tied to said power factor control means' current limiting input for limiting in-rush current, said current limiting means disposed between said second common point and ground; and (i) feedback means for determining the level of said DC output voltage and sending said level to said power factor control means' feedback input.

15. The low in-rush current power factor control circuit of claim 14, wherein said feedback means comprises a transistor.

16. The low in-rush current power factor control circuit of claim 14, wherein said feedback means comprises a differential amplifier.

17. The low in-rush current power factor control circuit of claim 14, wherein said feedback means comprises an opto-isolator.

18. The low in-rush current power factor control circuit of claim 14, wherein said first energy storage is means is an inductor having a secondary winding with a voltage across said secondary winding and wherein said feedback means utilizes said voltage across said secondary winding to determine the level of said DC output voltage.

19. A low in-rush current, power factor control circuit, the circuit having a ground, an AC mains input voltage with a peak voltage and a DC output voltage, the circuit for regulating power factor, for limiting in-rush current that occurs upon initially applying the AC mains input voltage to the circuit and for regulating DC output voltage from a level above to below the peak voltage of the AC mains input voltage, comprising:

a) a first rectifier portion for rectifying the AC mains input to a full waver rectified output;

b) a first energy storage device for storing energy drawn from the AC mains input, said first energy storage device disposed between said full waver rectified output and a first common point;

c) a switch configured to be enabled and disabled by an enable/disable input, said switch when enabled adapted to draw energy through said first energy storage device whereby energy is stored within said first energy storage device, said switch when disabled adapted to release the energy stored in said first energy storage device, said switch disposed between said first common point and a second common point;

d) a filter for filtering switching transients resulting from said switch switching from enabled to disabled and disabled to enabled, said filter disposed between said full wave rectified output and ground;

e) a power factor control circuit configured for manipulating the enable/disable input of said switch to facilitate power factor regulation and DC output voltage regulation, said power factor control circuit having a current limiting input, a feedback input and an AC input tied to said full wave rectified output, said power factor control circuit tied to ground;

f) a second rectifier portion for half-wave rectifying the released energy from said first energy storage device, said second rectifier portion disposed between said first common point and a third common point;

g) capacitor for storing the half-wave rectified released energy from said second rectifier portion, a DC output voltage maintained across said capacitor, said capacitor disposed between said third common point and said full wave rectified output;

h) a current limiter tied to said power factor control circuits' current limiting input the current limiter configured for limiting in-rush current, said current limiter disposed between said second common point and ground; and i) a feedback portion for determining the level of said DC output voltage and sending said level to said power factor control circuits' feedback input.

20. A low in-rush current power factor control circuit, the circuit having a ground, an AC mains input voltage with a peak voltage and a DC output voltage, the circuit for regulating power factor, for limiting in-rush current that occurs upon initially applying the AC mains input voltage to the circuit and for regulating DC output voltage from a level above to below the peak voltage of the AC mains input voltage, comprising:

a) a first rectifier means for rectifying the AC mains input to a full wave rectified output;

b) an inductor for storing energy drawn from the AC mains input, said inductor having a secondary winding, said inductor disposed between said full wave rectified output and a first common point;

c) switching means adapted to be enabled and disabled by an enable/disable input, said switching means when enabled adapted to draw energy through said inductor whereby energy is stored within said inductor, said switching means when disable adapted to release the energy stored in said inductor, said switching means disposed between said first common point and a second common point;

d) filtering means for filtering switching transients resulting from said switching means switching from enabled to disabled and disabled to enabled, said filtering means disposed between said full wave rectified output and ground;

e) power factor control means for manipulating the enable/disable input of said switching means to facilitate power factor regulation and DC output voltage regulation, said power factor control means having a current limiting input, a feedback input, an AC input tied to said full wave rectified output and an inductor flux signal input tied to said secondary winding, said power factor control means tied to ground;

f) second rectifying means for half-wave rectifying the released energy from said inductor, said second rectifying means disposed between said first common point and a third common point;

g) capacitor for storing the half-wave rectified released energy from said second rectifying means, a DC output voltage maintained across said capacitor, said capacitor disposed between said third common point and said full wave rectified output;

h) current limiting means tied to said power factor control means current limiting input for limiting in-rush current, said current limiting means disposed between said second common point and ground; and i) feedback portion for determining the level of said DC output voltage and sending said level to said power factor control circuits' feedback input.

* * * * *